J. HAYDEN.
Ration Feed Box.
No. 56,557.
Patented July 24, 1866.
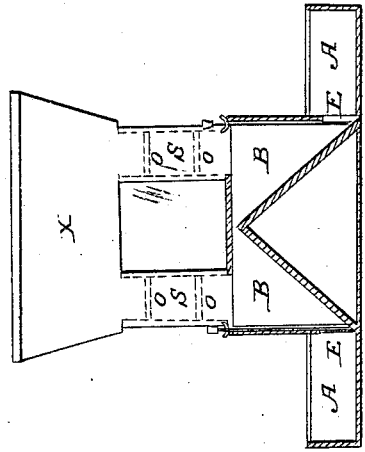
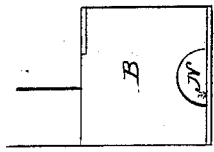
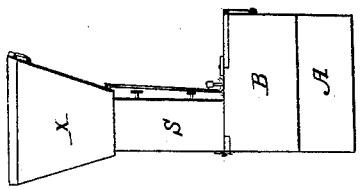
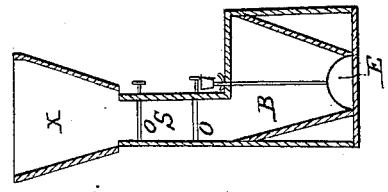
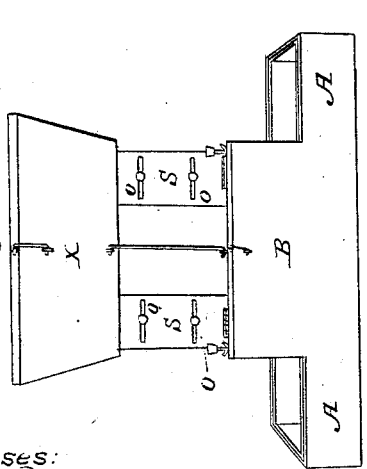
Witnesses:
Abram Brown
Jonas G. Clay
Inventor
James Hayden

UNITED STATES PATENT OFFICE.

JAMES HAYDEN, OF EXETER, WISCONSIN.

IMPROVEMENT IN RATION FEED-BOX.

Specification forming part of Letters Patent No. 56,557, dated July 24, 1866.

*To all whom it may concern:*

Be it known that I, JAMES HAYDEN, of the town of Exeter, in Green county, State of Wisconsin, have invented a new and Improved Ration Feed-Box for feeding horses and other animals their grain or ground feed; and that I do hereby declare that the following is a full, clear, and exact description thereof, reference being had to the accompanying drawings, making a part of this specification, like characters referring to like parts in each figure.

My invention relates to a new and improved manner of feeding horses and other animals their grain or ground feed in such a manner as will ordinarily compel the horse or other animal to more fully masticate his food when it shall be so desired by the person having the same in charge.

To enable others skilled in the art to construct and use my invention, I will proceed to describe its construction and operation.

A is a feed box or trough, made of the ordinary form, except that the side or end next to the ration-box B is, for convenience, made higher than the others, and also forms one side of the ration-box.

In this higher side or partition, and near the bottom of the feed-box, I cut an orifice or opening, N, for the purpose of allowing the grain or ground feed to pass from the ration-box B to the feed-box A.

The back part of the ration-box is inclined to the front part at an angle of forty-five degrees, more or less, and terminates at or forms the front part below the opening N. The other sides or ends of the ration-box are also made inclined in such a manner as to guide the grain or ground feed toward and into the opening N. To close this opening I employ a slide or gate, E, that works in grooves or channels cut in front part of ration-box. For the purpose of raising or lowering this slide or gate I attach thereto a vertical rod having its upper part cut as a screw, upon which is a nut that works against or upon the top of the box. This slide may be made to keep the place desired by closely fitting it in the grooves or by means of a small wedge; but, if operated by the rod and nut, the rod should pass through a piece of wood or metal near the top of the ration-box to hold the nut, so that by operating the latter the gate or slide is raised and lowered at pleasure.

The ration-box may be made with or without a lid. The sides of the ration-box being inclined causes the grain or ground feed within it to pass toward and through the opening N into the feed-box A, while the slide or gate E regulates the flow of the grain in any desired quantity.

There is or may be attached to the ration-box, by a hole in the top or lid of the same, or by supports put across the top or near the top of said ration-box, a measure-box furnished with one or more slides operating in grooves or on cleats and through a hole cut in the front part of the measure-box, which slides are for the purpose of keeping the grain or ground feed from passing into the ration-box till required, and also to measure the same when desired, which slides are worked by means of a ring or small handle to open the same, and closed by pressing the same back by physical force.

The measure-box S, having the openings for the slides O, is attached or connected to a reservoir-box, X, and is made to hold such amount of grain or ground feed as may be desired, and the ends may be perpendicular or inclined, the inclinations best serving the purpose when terminating near the openings connecting the bottom of the reservoir-box with the measure-box, as shown in the accompanying drawings, said reservoir-box being furnished in the bottom part with openings to correspond with and connect with the measure-box.

The ration-box and reservoir-box are best secured by making a square or oblong box and connecting the inclined sides of the ration-box and reservoir-box to the sides of the square or oblong boxes, as shown in the accompanying drawings.

In the accompanying drawings, Figure 1 represents a front outside view. Fig. 2 represents an inside view of the same. Fig. 3 represents an outside side view, and Fig. 4 represents an inside side view, of the same.

Said ration feed-box may be made double for two or more horses or other animals, as the same is shown in the accompanying drawings, or single for one horse or other animal, the several parts of the single or double ration feed-box as a whole being substantially the same.

What I claim as new, and for which I desire Letters Patent of the United States, is—

1. The ration-box B, when constructed, arranged, and used in connection with the feed-box A, substantially as herein set forth and described.

2. The gate or slide E, when constructed and used substantially as and for the purpose set forth.

3. The measure-box S and slides, when constructed, arranged, and used in connection with the ration-box and reservoir-box, substantially in the manner and for the purpose described.

4. The reservoir-box X, when used in connection with the measure-box, substantially in the manner and for the purpose set forth.

5. The rod and nut used in connection with the gate or slide E, when the whole are constructed, arranged, and used substantially as and for the purposes set forth.

6. The opening N, connecting the feed-box A with the ration-box B, when combined, arranged, and used in connection with the gate or slide E, substantially as and for the purpose set forth.

JAMES HAYDEN.

Witnesses:
G. H. PORTER,
S. B. WATSON.